United States Patent
Ellis et al.

(10) Patent No.: US 9,298,252 B2
(45) Date of Patent: Mar. 29, 2016

(54) STORAGE CONTROL SYSTEM WITH POWER DOWN MECHANISM AND METHOD OF OPERATION THEREOF

(71) Applicant: SMART Storage Systems, Inc., Chandler, AZ (US)

(72) Inventors: Robert W. Ellis, Phoenix, AZ (US); Theron Wayne Virgin, Gilbert, AZ (US); Scott Creasman, Gilbert, AZ (US)

(73) Assignee: SMART STORAGE SYSTEMS, INC., Milpitas, CA (US)

( * ) Notice: Subject to any disclaimer, the term of this patent is extended or adjusted under 35 U.S.C. 154(b) by 353 days.

(21) Appl. No.: 13/855,567

(22) Filed: Apr. 2, 2013

(65) Prior Publication Data

US 2013/0275795 A1   Oct. 17, 2013

Related U.S. Application Data

(60) Provisional application No. 61/625,645, filed on Apr. 17, 2012.

(51) Int. Cl.
   *G06F 1/32* (2006.01)

(52) U.S. Cl.
   CPC ............... *G06F 1/3268* (2013.01); *G06F 1/32* (2013.01); *Y02B 60/1246* (2013.01); *Y02B 60/32* (2013.01)

(58) Field of Classification Search
   CPC ........... G06F 1/32; G06F 1/3203; G06F 1/30; G06F 1/28; G06F 1/00
   USPC ......... 713/300, 310, 320, 321, 322, 323, 324, 713/330, 340, 375
   See application file for complete search history.

(56) References Cited

U.S. PATENT DOCUMENTS

| | | | |
|---|---|---|---|
| 4,048,481 A | | 9/1977 | Bailey, Jr. et al. |
| 4,322,766 A | | 3/1982 | Becker et al. |
| 4,528,458 A | | 7/1985 | Nelson et al. |
| 4,600,962 A | | 7/1986 | Bliehall |
| 5,193,176 A | * | 3/1993 | Brandin ..................... 714/14 |
| 5,311,395 A | | 5/1994 | McGaha et al. |

(Continued)

FOREIGN PATENT DOCUMENTS

EP   1 956 489 A2   8/2008

OTHER PUBLICATIONS

International Search Report and Written Opinion dated Jan. 26, 2015, received in International Patent Application No. PCT/US2014/059118, which corresponds to U.S. Appl. No. 14/135,371, 11 pages (Lucas).

(Continued)

*Primary Examiner* — Jaweed A Abbaszadeh
*Assistant Examiner* — Keshab Pandey
(74) *Attorney, Agent, or Firm* — Morgan, Lewis & Bockius LLP

(57) ABSTRACT

A storage control system and method of operation thereof includes: a control unit for initiating a hardening process beginning at a power-down signal; a counter module, coupled to the control unit for tracking a recorded time beginning at the power-down signal; a completion module, coupled to the counter module, for generating a work-complete entry in memory devices at a conclusion of the hardening process; and a calculation module, coupled to the completion module, for calculating a power down margin by determining the recorded time between the work-complete entry and a complete power loss of a hold-up power.

17 Claims, 6 Drawing Sheets

(56) References Cited

U.S. PATENT DOCUMENTS

| | | |
|---|---|---|
| 5,479,638 A | 12/1995 | Assar et al. |
| 5,568,429 A | 10/1996 | D'Souza et al. |
| 5,832,515 A | 11/1998 | Ledain et al. |
| 5,930,504 A | 7/1999 | Gabel |
| 5,949,785 A | 9/1999 | Beasley |
| 5,963,983 A | 10/1999 | Sakakura et al. |
| 5,996,054 A | 11/1999 | Ledain et al. |
| 6,091,652 A | 7/2000 | Haehn et al. |
| 6,275,436 B1 | 8/2001 | Tobita et al. |
| 6,345,367 B1 | 2/2002 | Sinclair |
| 6,356,447 B2 | 3/2002 | Scafidi |
| 6,381,670 B1 | 4/2002 | Lee et al. |
| 6,393,584 B1 | 5/2002 | McLaren et al. |
| 6,412,080 B1 | 6/2002 | Fleming et al. |
| 6,552,581 B1 | 4/2003 | Gabara |
| 6,587,915 B1 | 7/2003 | Kim |
| 6,597,073 B1 | 7/2003 | Check |
| 6,618,249 B2 | 9/2003 | Fairchild |
| 6,678,788 B1 | 1/2004 | O'Connell |
| 6,728,913 B1 | 4/2004 | Parker |
| 6,738,268 B1 | 5/2004 | Sullivan et al. |
| 6,763,424 B2 | 7/2004 | Conley |
| 6,775,792 B2 | 8/2004 | Ulrich et al. |
| 6,778,387 B2 | 8/2004 | Fairchild |
| 6,850,443 B2 | 2/2005 | Lofgren et al. |
| 6,854,070 B2 | 2/2005 | Johnson et al. |
| 6,903,972 B2 | 6/2005 | Lasser et al. |
| 6,906,961 B2 | 6/2005 | Eggleston et al. |
| 6,975,028 B1 | 12/2005 | Wayburn et al. |
| 7,082,495 B2 | 7/2006 | DeWhitt et al. |
| 7,107,389 B2 | 9/2006 | Inagaki et al. |
| 7,139,864 B2 | 11/2006 | Bennett et al. |
| 7,233,497 B2 | 6/2007 | Simon et al. |
| 7,243,186 B2 | 7/2007 | Liang et al. |
| 7,330,927 B1 | 2/2008 | Reeve et al. |
| 7,333,364 B2 | 2/2008 | Yu et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,613,871 B2 | 11/2009 | Tanaka et al. |
| 7,620,769 B2 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,738,502 B2 | 6/2010 | Chang et al. |
| 7,743,216 B2 | 6/2010 | Lubbers et al. |
| 7,818,525 B1 | 10/2010 | Frost et al. |
| 7,827,348 B2 | 11/2010 | Lee et al. |
| 7,830,164 B2 | 11/2010 | Earle et al. |
| 7,870,338 B2 | 1/2011 | Iida et al. |
| 7,979,614 B1 | 7/2011 | Yang |
| 8,001,135 B2 | 8/2011 | Perlmutter et al. |
| 8,001,419 B2 * | 8/2011 | Killian et al. ............ 714/14 |
| 8,010,738 B1 | 8/2011 | Chilton et al. |
| 8,028,123 B2 | 9/2011 | Kilzer et al. |
| 8,046,645 B2 | 10/2011 | Hsu et al. |
| 8,051,241 B2 | 11/2011 | Feldman et al. |
| 8,072,805 B2 | 12/2011 | Chou et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,219,724 B1 | 7/2012 | Caruso et al. |
| 8,219,776 B2 | 7/2012 | Forhan et al. |
| 8,228,701 B2 | 7/2012 | Sokolov et al. |
| 8,245,101 B2 | 8/2012 | Olbrich et al. |
| 8,254,172 B1 | 8/2012 | Kan |
| 8,259,506 B1 | 9/2012 | Sommer et al. |
| 8,289,801 B2 | 10/2012 | Smith et al. |
| 8,332,578 B2 | 12/2012 | Frickey, III et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,407,409 B2 | 3/2013 | Kawaguchi |
| 8,464,106 B2 | 6/2013 | Filor et al. |
| 8,612,804 B1 | 12/2013 | Kang et al. |
| 2002/0159285 A1 | 10/2002 | Morley et al. |
| 2003/0046603 A1 | 3/2003 | Harari et al. |
| 2003/0074592 A1 | 4/2003 | Hasegawa |
| 2003/0126494 A1 | 7/2003 | Strasser |
| 2003/0163633 A1 | 8/2003 | Aasheim et al. |
| 2004/0080985 A1 | 4/2004 | Chang et al. |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0073884 A1 | 4/2005 | Gonzalez et al. |
| 2005/0114587 A1 | 5/2005 | Chou et al. |
| 2005/0134288 A1 | 6/2005 | Monter et al. |
| 2005/0223206 A1 | 10/2005 | Janzen et al. |
| 2006/0020745 A1 | 1/2006 | Conley et al. |
| 2006/0039196 A1 | 2/2006 | Gorobets et al. |
| 2006/0108875 A1 | 5/2006 | Grundmann et al. |
| 2006/0136682 A1 | 6/2006 | Haridas et al. |
| 2006/0143365 A1 | 6/2006 | Kikuchi |
| 2006/0253641 A1 | 11/2006 | Gatzemeier et al. |
| 2006/0256624 A1 | 11/2006 | Eggleston et al. |
| 2006/0282644 A1 | 12/2006 | Wong |
| 2006/0294574 A1 | 12/2006 | Cha |
| 2007/0061511 A1 | 3/2007 | Faber |
| 2007/0083779 A1 | 4/2007 | Misaka et al. |
| 2007/0180188 A1 | 8/2007 | Fujbayashi et al. |
| 2007/0234004 A1 | 10/2007 | Oshima et al. |
| 2007/0260811 A1 | 11/2007 | Merry, Jr. et al. |
| 2007/0263444 A1 | 11/2007 | Gorobets et al. |
| 2007/0276973 A1 | 11/2007 | Tan et al. |
| 2008/0046630 A1 | 2/2008 | Lasser |
| 2008/0052446 A1 | 2/2008 | Lasser et al. |
| 2008/0082736 A1 | 4/2008 | Chow et al. |
| 2008/0183918 A1 | 7/2008 | Dhokia et al. |
| 2008/0313505 A1 | 12/2008 | Lee et al. |
| 2009/0019321 A1 | 1/2009 | Radke |
| 2009/0089485 A1 | 4/2009 | Yeh |
| 2009/0157948 A1 | 6/2009 | Trichina et al. |
| 2009/0164702 A1 | 6/2009 | Kern |
| 2009/0168525 A1 | 7/2009 | Olbrich et al. |
| 2009/0172262 A1 | 7/2009 | Olbrich et al. |
| 2009/0259896 A1 | 10/2009 | Hsu et al. |
| 2009/0323419 A1 | 12/2009 | Lee et al. |
| 2009/0327581 A1 | 12/2009 | Coulson |
| 2009/0327591 A1 | 12/2009 | Moshayedi |
| 2010/0008175 A1 | 1/2010 | Sweere et al. |
| 2010/0011261 A1 | 1/2010 | Cagno et al. |
| 2010/0017650 A1 | 1/2010 | Chin et al. |
| 2010/0023674 A1 | 1/2010 | Aviles |
| 2010/0050053 A1 | 2/2010 | Wilson et al. |
| 2010/0052426 A1 | 3/2010 | Carter et al. |
| 2010/0052625 A1 | 3/2010 | Cagno et al. |
| 2010/0095048 A1 | 4/2010 | Bechtolsheim et al. |
| 2010/0103737 A1 | 4/2010 | Park |
| 2010/0138592 A1 | 6/2010 | Cheon |
| 2010/0169541 A1 | 7/2010 | Freikorn |
| 2010/0174845 A1 | 7/2010 | Gorobets et al. |
| 2010/0217915 A1 | 8/2010 | O'Connor et al. |
| 2010/0217920 A1 * | 8/2010 | Song ............ G06F 12/0246 711/103 |
| 2010/0287328 A1 | 11/2010 | Feldman et al. |
| 2010/0293367 A1 | 11/2010 | Berke et al. |
| 2010/0318719 A1 | 12/2010 | Keays et al. |
| 2010/0332726 A1 | 12/2010 | Wang |
| 2011/0055468 A1 | 3/2011 | Gonzalez et al. |
| 2011/0066788 A1 | 3/2011 | Eleftheriou et al. |
| 2011/0066872 A1 | 3/2011 | Miller et al. |
| 2011/0085657 A1 | 4/2011 | Matthews, Jr. |
| 2011/0131365 A1 | 6/2011 | Zhang et al. |
| 2011/0131447 A1 | 6/2011 | Prakash et al. |
| 2011/0145473 A1 | 6/2011 | Maheshwari |
| 2011/0190963 A1 | 8/2011 | Glassl et al. |
| 2011/0191649 A1 | 8/2011 | Lim et al. |
| 2011/0320687 A1 | 12/2011 | Belluomini et al. |
| 2012/0047320 A1 | 2/2012 | Yoo et al. |
| 2012/0047409 A1 | 2/2012 | Post et al. |

(56) References Cited

U.S. PATENT DOCUMENTS

| | | | |
|---|---|---|---|
| 2012/0054456 A1 | 3/2012 | Grube et al. | |
| 2012/0084492 A1 | 4/2012 | Stenfort | |
| 2012/0089855 A1 | 4/2012 | Beckoff et al. | |
| 2012/0124046 A1 | 5/2012 | Provenzano | |
| 2012/0124273 A1 | 5/2012 | Goss et al. | |
| 2012/0151260 A1 | 6/2012 | Zimmermann et al. | |
| 2012/0221801 A1* | 8/2012 | Okawa | G06F 1/3212 711/154 |
| 2012/0266048 A1 | 10/2012 | Chung et al. | |
| 2012/0271990 A1 | 10/2012 | Chen et al. | |
| 2012/0331207 A1 | 12/2012 | Lassa et al. | |
| 2013/0019076 A1 | 1/2013 | Amidi et al. | |
| 2013/0073788 A1 | 3/2013 | Post et al. | |
| 2013/0100600 A1 | 4/2013 | Yin et al. | |
| 2013/0336081 A1 | 12/2013 | Sheets et al. | |
| 2014/0001861 A1 | 1/2014 | Mann et al. | |
| 2014/0006798 A1 | 1/2014 | Prakash et al. | |
| 2014/0008970 A1 | 1/2014 | Yamaguchi | |
| 2014/0012522 A1 | 1/2014 | Colombi et al. | |
| 2014/0215103 A1 | 7/2014 | Cohen et al. | |
| 2014/0269053 A1 | 9/2014 | Chen et al. | |
| 2015/0052397 A1 | 2/2015 | Nakamura et al. | |

OTHER PUBLICATIONS

International Preliminary Report on Patentability dated Oct. 30, 2014, received in International Patent Application No. PCT/US2013/035162, which corresponds to U.S. Appl. No. 13/855,567, 4 pages (Ellis).

Cooke, "Introduction to Flash Memory (T1A)," Flash Memory Summit, Aug. 22, 2008, Micron Technology, Inc., 102 pages.

Gal et al., "Algorithms and Data Structures for Flash Memories," ACM Computing Surveys, Jun. 2005, vol. 37, No. 2, 30 pages.

IBM Corporation, "Systems Management, Work Management" Version 5, Release 4, 9th Edition, Feb. 2006, pp. 1-21.

O'Brien, "SMART Storage Systems Optmus SAS Enterprise SSD Review," SMART Storage Systems, Oct. 9, 2012, 44 pages.

Spanjer, "Flash Management—Why and How?" Smart Modular Technologies, Nov. 2009, http://www.scantec.de/fileadmin/pdf/Smart_Modular/Flash-Management.pdf, 14 pages.

Texas Instruments, "Power Management IC for Digital Set Top Boxes," SLVSA10A, Sep. 2009, pp. 1-22.

International Search Report and Written Opinion dated Dec. 20, 2013, received in PCT/US2013/045282, which corresponds to U.S. Appl. No. 13/493,949, 7 pages (Ellis).

Search Report dated Jul. 26, 2013 for PCT International Application No. PCT/US2013/035162.

IBM Corporation, "Systems Management Controlling System Shutdown Using a Power-Handling Program", Version 5, Release 4, 9th Edition, pp. 1-21, Feb. 2006.

Texas Instruments, "Power Management IC for Digital Set Top Boxes", SLVSA10A, pp. 1-22, Sep. 2009.

International Search Report and Written Opinion dated Jul. 26, 2013, received in International Patent Application No. PCT/US2013/035162, which corresponds to U.S. Appl. No. 13/855,567, 7 pages (Ellis).

International Search Report and Written Opinion dated May 27, 2015, received in International Patent Application No. PCT/US2014/067476, which corresponds to U.S. Appl. No. 14/135,417, 14 pages (Lucas).

International Search Report and Written Opinion dated Jul. 14, 2015, received in International Patent Application No. PCT/US2015/027263, which corresponds to U.S. Appl. No. 14/599,128, 10 pages (Ellis).

* cited by examiner

STORAGE CONTROL SYSTEM WITH POWER DOWN MECHANISM AND METHOD OF OPERATION THEREOF

CROSS-REFERENCE TO RELATED APPLICATION(S)

This application claims the benefit of U.S. Provisional Patent Application Ser. No. 61/625,645 filed Apr. 17, 2012, and the subject matter thereof is incorporated herein by reference thereto.

TECHNICAL FIELD

The present invention relates generally to a storage control system and more particularly to a control system for power down.

BACKGROUND ART

Data storage, often called storage or memory, refers to computer components and recording media that retain digital data. Data storage is a core function and fundamental component of consumer and industrial electronics, especially devices such as computers, televisions, cellular phones, mobile devices, and digital video cameras.

An information system is generally equipped with a data storage system using a hard disk drive (HDD) as a storage device. The data storage system is accessed from a plurality of higher-level devices (for example, hosts) via a storage area network (SAN). Storage control in the data storage system can be implemented according to a RAID (Redundant Array of Independent (or Inexpensive)) technology. As a result, a highly reliable information system can be realized.

The data storage system can include a flash memory that is installed instead of or in addition to an HDD and data that will be read out or written into a higher-level device are stored in the flash memory. It can be anticipated that the data storage system having the same storage capacity as a storage system based on HDD will be realized by providing a large number of flash memories. As the capacity and a number of the flash memories increase, data stored in the flash memories must be properly managed to order to improve reliability of the data storage system.

Thus, a need still remains for improved reliability in data storage systems. In view of the increasing demand for improved data management, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a storage control system, including: initiating a hardening process beginning at a power-down signal; tracking a recorded time beginning at the power-down signal; generating a work-complete entry in memory devices at a conclusion of the hardening process; and calculating a power down margin by determining the recorded time between the work-complete entry and a complete power loss of a hold-up power.

The present invention provides a storage control system, including: a control unit for initiating a hardening process beginning at a power-down signal; a counter module, coupled to the control unit, for tracking a recorded time beginning at the power-down signal; a completion module, coupled to the counter module, for generating a work-complete entry in memory devices at a conclusion of the hardening process; and a calculation module, coupled to the completion module, for calculating a power down margin by determining the recorded time between the work-complete entry and a complete power loss of a hold-up power.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The term "module" referred to herein can include firmware, or hardware running software, or a combination thereof in the present invention in accordance with the context in which the term is used. For example, the software being run by hardware can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

When an electronic device shuts down using a reserve power source or the hold-up power, there is a finite amount of time in which each of the tasks involved must be able to accomplish the work they have been allocated. Good engineering requires that a worst-case time must be established for each of the tasks and then a margin be added onto that worst-case time to ensure that the entire shutdown operation can be completed in the time over which the reserve power source is able to provide power to the electronic device.

Figure 1:
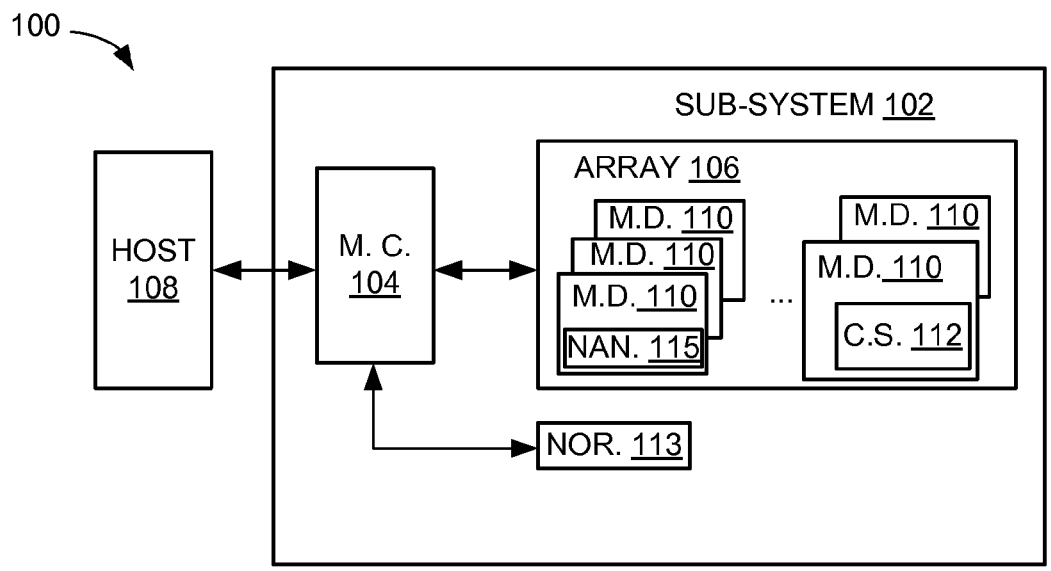
FIG. 1 is a storage control system with power down mechanism in an embodiment of the present invention.

Referring now to FIG. 1, therein is shown a storage control system 100 with power down mechanism in an embodiment of the present invention. The storage control system 100 includes a memory sub-system 102 having a memory controller 104 and a memory array 106. The memory sub-system 102 can also include a NOR device 113. The storage control system 100 includes a host system 108 communicating with the memory sub-system 102.

The memory controller 104 provides data control and management of the memory array 106. The memory controller 104 interfaces with the host system 108 and controls the memory array 106 to transfer data between the host system 108 and the memory array 106.

The memory array 106 includes an array of memory devices 110 including flash memory devices or non-volatile memory devices. For example, the memory devices 110 can include NAND flash, NOR flash, or a combination thereof for storing host data, meta data, ancillary data error logs, running statistics, and running configurations. It is understood that the use of NOR flash and NAND flash can be interchangeable based on the configuration and purpose of the storage control system 100.

The memory devices 110 can include NAND flash, NOR flash, or a combination thereof, which are two different types of non-volatile memory. The storage control system 100 can include both types of memory or only one type. For example, the memory devices 110 can include a NAND device 115 for storing information. Examples of NOR flash can include serial peripheral interface (SPI) NOR flash, magnetoresistive random-access memory (MRAM), Phase Change Memory (PCM), Ferromagnetic random-access memory (FRAM), or a combination thereof. The types of non-volatile memory used by the memory array 106 can be based on the intended purpose and hardware specification requirements of the storage control system 100.

The NAND device 115 can be part of a larger array of NAND flash memory. The memory array 106 can include pages of data or information. The host system 108 can request the memory controller 104 for reading, writing, and erasing data from or to the memory array 106.

The memory devices 110 can include chip selects 112, which are defined as control inputs, for enabling the memory devices 110. Each of the chip selects 112 can be used to control the operation of one of the memory devices 110. When the chip selects 112 are enabled, the memory devices 110 are in active state for operation including reading, writing, or recycling.

The memory sub-system 102 can also include a NOR device 113. The NOR device 113 can be an additional storage device to the memory array 106. The NOR device 113 can be used to partition different types of information and data from the memory array 106. The NOR device 113 can include serial peripheral interface (SPI) NOR flash, magnetoresistive random-access memory (MRAM), Phase Change Memory (PCM), Ferromagnetic random-access memory (FRAM), or a combination thereof.

Figure 2:
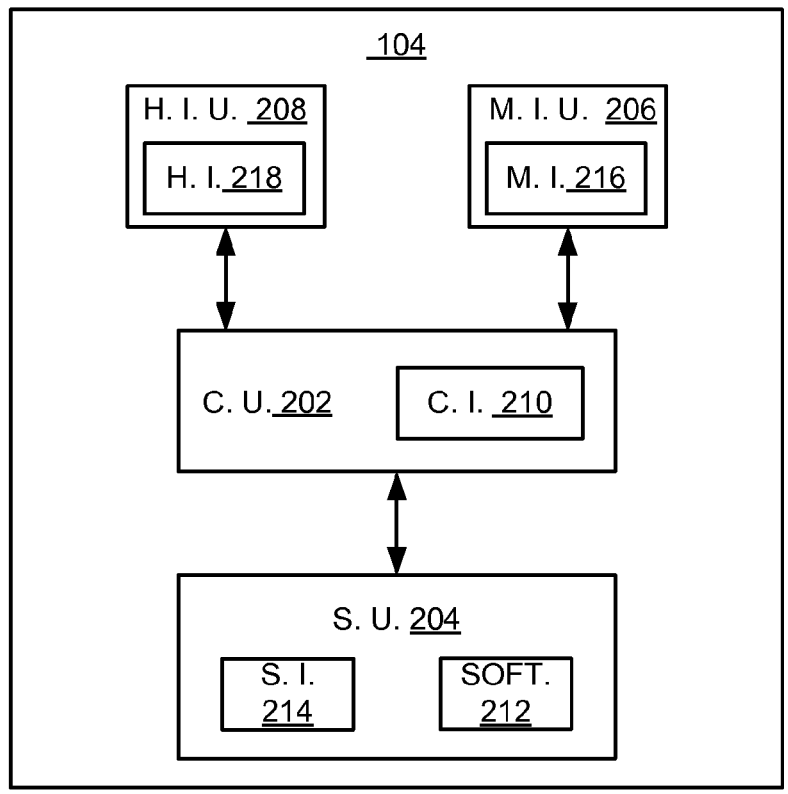
FIG. 2 is an exemplary hardware block diagram of the memory controller.

Referring now to FIG. 2, therein is shown an exemplary hardware block diagram of the memory controller 104. The memory controller 104 can include a control unit 202, a storage unit 204, a memory interface unit 206, and a host interface unit 208. The control unit 202 can include a control interface 210. The control unit 202 can execute a software 212 stored in the storage unit 204 to provide the intelligence of the memory controller 104.

The control unit 202 can be implemented in a number of different manners. For example, the control unit 202 can be a processor, an embedded processor, a microprocessor, a hardware control logic, a hardware finite state machine (FSM), a digital signal processor (DSP), or a combination thereof. The control unit 202 can include multiple independent controllers for controlling different components of the storage control system 100 such as the memory array 106 of FIG. 1 and the NOR device 113 of FIG. 1.

The control interface 210 can be used for communication between the control unit 202 and other functional units in the memory controller 104. The control interface 210 can also be used for communication that is external to the memory controller 104.

The control interface 210 can receive information from the other functional units or from external sources, or can transmit information to the other functional units or to external destinations. The external sources and the external destinations refer to sources and destinations external to the memory controller 104.

The control interface 210 can be implemented in different ways and can include different implementations depending on which functional units or external units are being interfaced with the control interface 210. For example, the control interface 210 can be implemented with a pressure sensor, an inertial sensor, a microelectromechanical system (MEMS), optical circuitry, waveguides, wireless circuitry, wireline circuitry, or a combination thereof.

The storage unit 204 can store the software 212. The storage unit 204 can be a volatile memory, a nonvolatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM). Further for example, the storage unit 204 can include SPI NOR flash for storing firmware, error log files, running statistics, and runtime configurations.

The storage unit 204 can include a storage interface 214. The storage interface 214 can also be used for communication that is external to the memory controller 104. The storage interface 214 can receive information from the other functional units or from external sources, or can transmit information to the other functional units or to external destinations. The external sources and the external destinations refer to sources and destinations external to the memory controller 104.

The storage interface 214 can include different implementations depending on which functional units or external units are being interfaced with the storage unit 204. The storage interface 214 can be implemented with technologies and techniques similar to the implementation of the control interface 210.

The memory interface unit 206 can enable external communication to and from the memory controller 104. For example, the memory interface unit 206 can permit the memory controller 104 to communicate with the memory array 106 of FIG. 1.

The memory interface unit 206 can include a memory interface 216. The memory interface 216 can be used for communication between the memory interface unit 206 and other functional units in the memory controller 104. The memory interface 216 can receive information from the other functional units or can transmit information to the other functional units.

The memory interface 216 can include different implementations depending on which functional units are being interfaced with the memory interface unit 206. The memory interface 216 can be implemented with technologies and techniques similar to the implementation of the control interface 210.

The host interface unit 208 allows the host system 108 of FIG. 1 to interface and interact with the memory controller 104. The host interface unit 208 can include a host interface 218 to provide communication mechanism between the host interface unit 208 and the host system 108.

The control unit 202 can operate the host interface unit 208 to send control or status information generated by the memory controller 104 to the host system 108. The control unit 202 can also execute the software 212 for the other functions of the memory controller 104. The control unit 202 can further execute the software 212 for interaction with the memory array 106 via the memory interface unit 206.

The functional units in the memory controller 104 can work individually and independently of the other functional units. For illustrative purposes, the memory controller 104 is described by operation of the memory controller 104 with the host system 108 and the memory array 106. It is understood that the memory controller 104, the host system 108, and the memory array 106 can operate any of the modules and functions of the memory controller 104.

Figure 3:
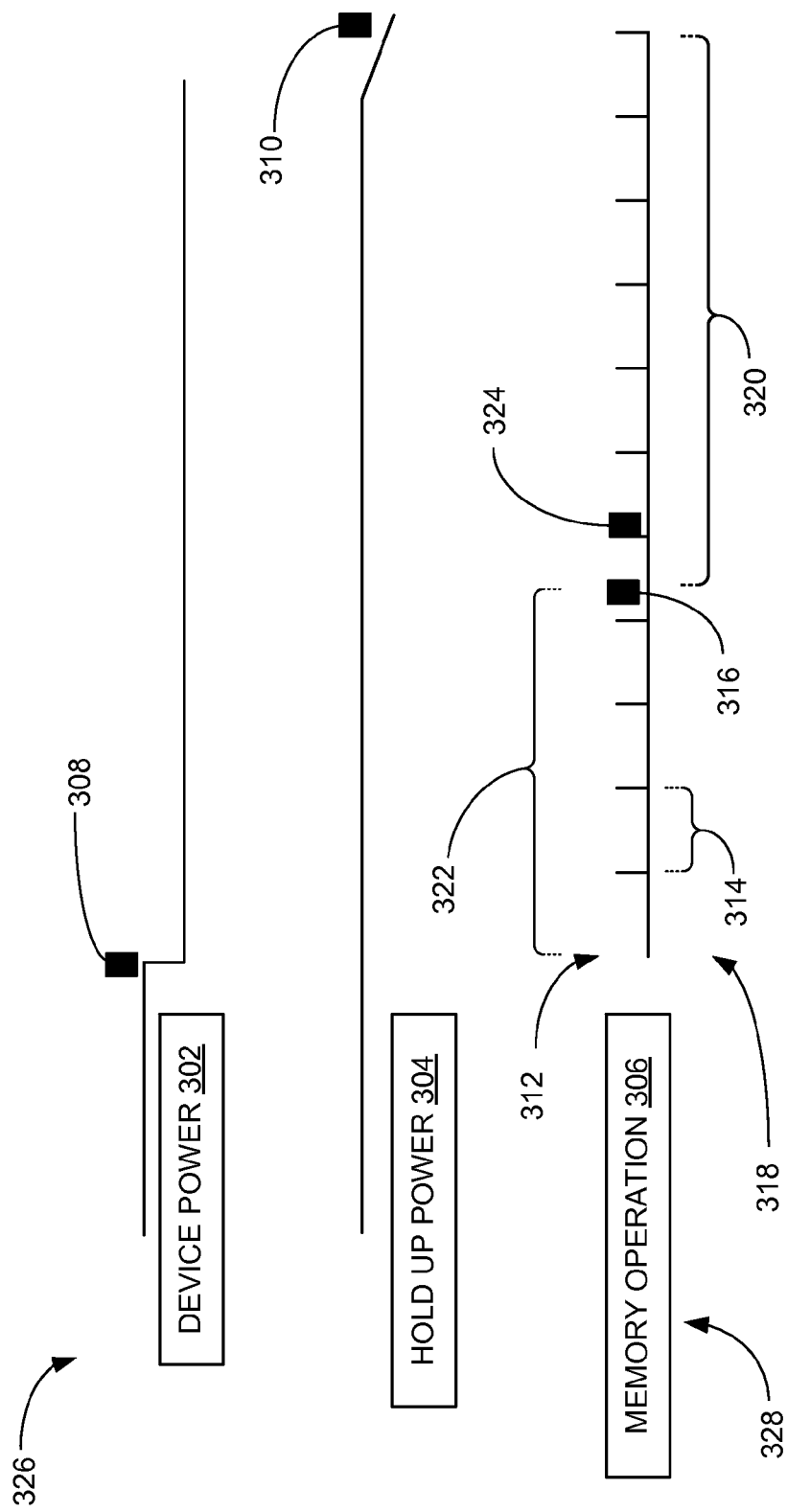
FIG. 3 is a first exemplary timing diagram of the storage control system.

Referring now to FIG. 3, therein is shown a first exemplary timing diagram of the storage control system 100 of FIG. 1. The exemplary timing diagram includes a timing sequence for a device power 302, a hold-up power 304, and a memory operation 306 of the storage control system 100.

The device power 302 indicates a power on status of the storage control system 100 or when main power is supplied to the storage control system 100. The exemplary timing diagram illustrates power switching from on to off at a power-down signal 308.

The power-down signal 308 is a signal that indicates when the device power 302 is off or when main power is off. The power-down signal 308 can occur during a device shutdown sequence or during a power failure, which is an unexpected power loss.

The hold-up power 304 is defined as a stored source of power used to provide power to the storage control system 100 after the device power 302 is turned off. For example, the hold-up power 304 can give the memory controller 104 of FIG. 1 and the memory devices 110 of FIG. 1 time to continue to operate and time to store information after a power down sequence or a sudden loss of the device power 302.

The hold-up power 304 starts to supply the storage control system 100 at the power-down signal 308. The hold-up power 304 can supply power for all circuitry of the storage control system 100 until the hold-up power 304 reaches an unusable level at a complete power loss 310.

The complete power loss 310 is a situation where the storage control system 100 is out of power with both the device power 302 and the hold-up power 304. At the complete power loss 310, the storage control system 100 lacks the power to perform any operations.

The memory operation 306 is a period of time where information is being written into memory. For example, the memory operation 306 can indicate when information is written to non-volatile memory, such as the memory devices 110. The memory operation 306 can include a hardening process 312.

The hardening process 312 is defined as a process of storing user and system information before the complete power loss 310 of the storage control system 100. For example, the hardening process 312 can include storing user data to the memory devices 110 upon detection of the power-down signal 308. The hardening process 312 also includes storing in-flight data 328 or in-transit data before the complete power loss 310. The process can be run every time the memory controller 104 and the memory devices 110 are powered down.

During the hardening process 312, information can be stored and manipulated in the memory devices 110, such as non-volatile memory. For example, host data and meta data can be stored in the NAND device 115 of FIG. 1. Further for example, Information stored on the non-volatile memory can be a small size of approximately 128 bytes or less. The non-volatile memory can include a sufficient storage capacity to store tick entries 314.

The tick entries 314 are time information stored in the memory devices 110 during the memory operation 306. The tick entries 314 can track sub-divisions of time in duration of preferably up to an order of a millisecond after the power-down signal 308 is detected. The tick entries 314 are a pre-defined numerical value of time. The tick entries 314 can be stored in the NOR device 113 of FIG. 1.

The storage control system 100 can include a recorded time 318, which is a period or measurement of successive time intervals. The recorded time 318 can be determined by determining the amount of the tick entries 314 generated between one event and another event. For example, the recorded time 318 can be the measurement of the tick entries 314 between the power-down signal 308 and a work-complete entry 316.

The work-complete entry 316 is information or a marker of the time of the conclusion of the hardening process 312. After the storage of the in-flight data 328 is completed during the hardening process 312, the work-complete entry 316 can be generated by the memory controller 104.

A work length 322 is defined as a measurement for the time needed from the power-down signal 308 to the completion of the hardening process 312. The work length 322 can be determined by determining the recorded time 318 between the power-down signal 308 and the work-complete entry 316.

The storage control system 100 can include a method of measuring a power down margin 320 of the memory sub-system 102 of FIG. 1. The power down margin 320 is defined as a period of time between the completion of the hardening process 312 and the complete power loss 310. The power down margin 320 indicates additional spare power that is available to the storage control system 100 after the power-down signal 308 and the hardening process 312.

For example, as soon as the power-down signal 308 is detected, the memory controller 104 can begin writing the tick entries 314 into the memory devices 110, such as the NOR device 113. The tick entries 314 can include as many bits as required to record the information of the tick entries 314 and the work-complete entry 316 of the hardening process 312. The tick entries 314 can be approximately 1-N bytes of data written based on the information that is required to be stored.

A free-running counter can be used to generate the tick entries 314 that occur during the memory operation 306. Information from the hardening process 312 can be stored in the NAND device 115, such as the in-flight data 328. Information written to the memory devices 110 can be written into reserved sections of the memory devices 110.

After the completion of the hardening process 312, when all the in-flight data 328 or in-transit data has been stored, the memory controller 104 can generate the work-complete entry 316 in line with the tick entries 314. After the work-complete entry 316, the memory controller 104 can continue to write the tick entries 314 into the memory devices 110 until the complete power loss 310.

By counting the tick entries 314 before the work-complete entry 316 and the tick entries 314 following the work-complete entry 316, the memory controller 104 can determine the work length 322 or how long it took to complete the hardening process 312. The amount of the tick entries 314 that occur after the work-complete entry 316 is the power down margin 320 or the spare time that is available for the hardening process 312 of the next power-down cycle.

The hardening process 312 for each power cycle of the storage control system 100 can fluctuate. If the work length 322 required for the hardening process 312 fluctuates, the work length 322 of a worst-case scenario can be extrapolated to be used by the storage control system 100.

By determining the power down margin 320 for each power cycle, the memory controller 104 can generate a histogram 326 to determine a rate at which the power down margin 320 decreases as the hold-up power 304 of the storage control system 100 will decrease over use. The memory controller 104 can also generate the histogram 326 with the fluctuations of the work length 322. The histogram 326 can be stored in the memory devices 110, such as non-volatile memory.

The work length 322 of the hardening process 312 and the recorded time 318 of the power down margin 320 can provide information about the operational integrity of the storage control system 100. Decreases in performance of the work length 322 and the power down margin 320 can indicate a deterioration of the memory devices 110 and a deterioration of the hold-up power 304.

For example, if data is being stored into a NAND flash and the expected write time of the hardening process 312 is exceeded, that memory may be worn out and a new location in flash should be selected for shutdown storage. If the time it takes to navigate a data structure is exceeded, the data being stored may need to be reorganized to increase performance. The memory controller 104 can select a new location in the memory devices 110 to store data for improving read/write speed performance.

A buffer threshold 324 is a predetermined threshold or point for providing an alert of the deterioration of the power down margin 320. For example, the duration of the power down margin 320 can decrease over time due to continuous use of the memory devices 110. If the power down margin 320 falls below the buffer threshold 324, then there may be insufficient time to complete the hardening process 312 after the power-down signal 308.

An indication can be triggered when the power down margin 320 reaches the buffer threshold 324. If the duration of the power down margin 320 decreases, another section of the memory devices 110 can be selected for storing information. For example, if the power down margin 320 is below the buffer threshold 324, the memory controller 104 can replace the non-volatile memory used to store information.

It has been discovered that the power down margin 320 and the work length 322 of the hardening process 312 provides the amount of time that the storage control system 100 is able to continue operating after the device power 302 has been removed. The power down margin 320 can be used to indicate the spare time available to the storage control system 100 to complete the hardening process 312 and to ensure that the hardening process 312 does not exceed the available time provided by the hold-up power 304.

It has been discovered that determining the power down margin 320 and the work length 322 provides indicators for assessing the system integrity of the storage control system 100. If the duration of the power down margin 320 decreases, the detection of the decrease can provide information that the hold-up power 304 is degrading. The storage control system 100 can replace the non-volatile memory of the memory devices 110 for improving performance and the work length 322 of the hardening process 312 can be decreased to counteract a degradation of the hold-up power 304. The improved reliability is critical to address the concern that over time, the hold-up power 304 will degrade and that the power down margin 320 ensures that the storage control system 100 will continue to operate for time intended by the device's design.

It has been discovered that the duration of the hardening process 312 provides additional indicators for assessing the health and integrity of the memory devices 110 used for the hardening process 312. If the duration of the work length 322 increases, the storage control system 100 can replace the non-volatile memory of the memory devices 110 to increase the speed of the hardening process 312.

It has also been discovered that detection of the power-down signal 308 and measurement of the power down margin 320 for the hold-up power 304 provides improved reliability by providing a sufficient amount of time for the memory controller 104 to completely write the in-flight data 328 to the memory devices 110. The sufficient amount of time is critical since capacitors that provide the hold-up power 304 fade as storage drives age.

It has been discovered that writing the tick entries 314 into the memory devices 110, such as non-volatile memory can provide a low-level and inexpensive method of determining the power down margin 320 and the work length 322 of the hardening process 312 compared to other methods that use messaging mechanisms. The tick entries 314 provide a method of tracking the hold-up power 304 at the complete power loss 310, when no power remains to write to the memory devices 110.

It has been discovered that the storage control system 100 can include the use of multiple memory types, such as the NOR device 113 and the NAND device 115, including SPI NOR flash memory and NAND flash memory, to increase shutdown speed and preserve overall storage space. For example, information stored during the hardening process 312 including host data and meta data can be stored in NAND flash memory, while the information of the power-cycle record 402 can be stored in SPI NOR flash memory in parallel with the hardening process 312.

It has further been discovered that the histogram 326 provides improved reliability and predictability by indicating useful information including the rate at which the power down margin 320 decreases and the duration of the work length 322 of the hardening process 312 in order to monitor the integrity of the storage control system 100.

Figure 4:
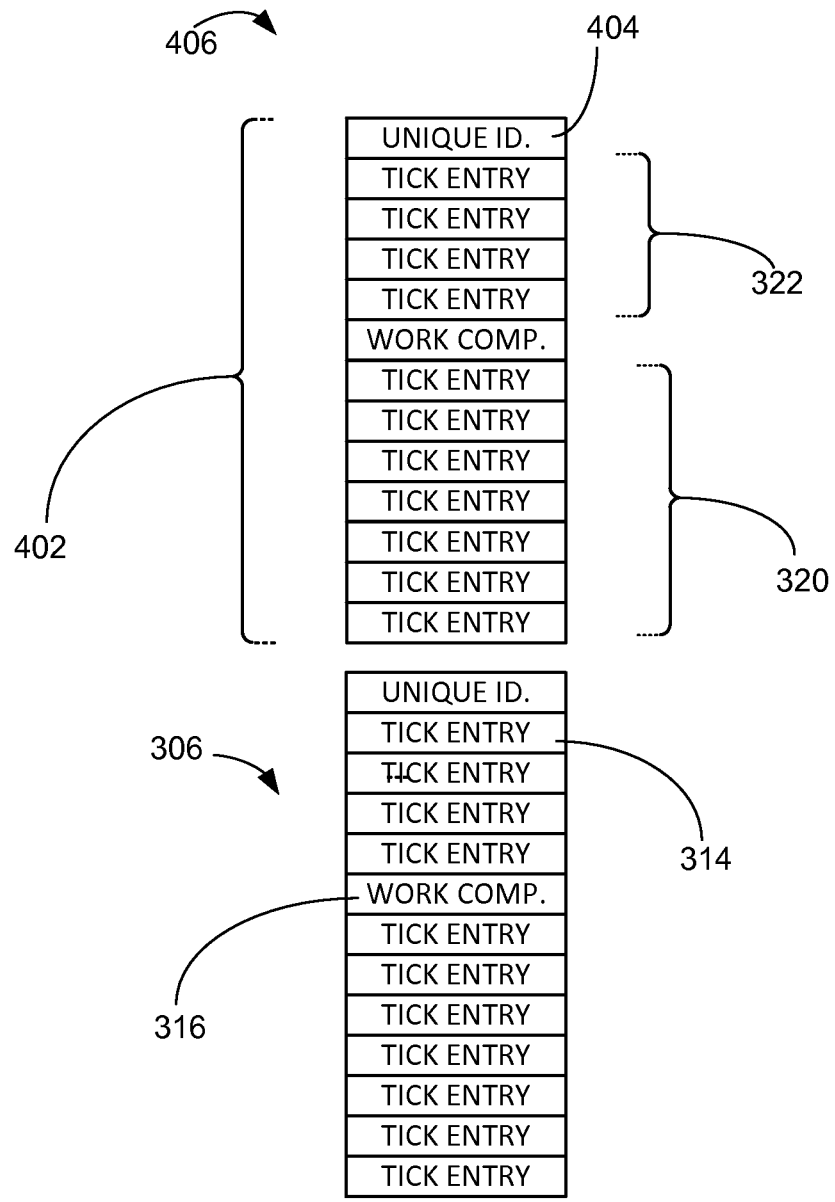
FIG. 4 is a detailed view of the memory operation.

Referring now to FIG. 4, therein is shown a detailed view of the memory operation 306. The detailed view can include an exemplary diagram for tracking the recorded time 318 of FIG. 3 of the tracking of the hardening process 312 of FIG. 3 and the power down margin 320 that is recorded in the memory devices 110 of FIG. 1.

The memory controller 104 of FIG. 1 can generate the tick entries 314 during the hardening process 312 and continue generating the tick entries 314 until the complete power loss 310 of FIG. 3. The tick entries 314 can be stored in the NOR device 113 of FIG. 1. The power down margin 320 can be calculated based on the number of the tick entries 314 after the work-complete entry 316 to the complete power loss 310.

The exemplary diagram can include a power-cycle record 402, which is defined as a collection of information including the tick entries 314, followed by the work-complete entry 316, and the plurality of the tick entries 314 that occur until the complete power loss 310. The power-cycle record 402 can be used to organize, analyze, and compare the work length 322 of the hardening process 312, the power down margin 320, and length of the hold-up power 304 over many power cycles.

If the memory devices 110 are implemented using a NOR flash memory, then storing information of the memory operation 306 can be time consuming and decrease the longevity of the memory devices 110 because NOR flash memory has a limited number of erases that can be performed. The organization of the information of the memory operation 306 into the power-cycle record 402 can reduce the number of times the memory devices 110 are erased and improve the ability to track changes in the hardening process 312 and the power down margin 320.

For example, to increase the longevity of the memory device 110, such as non-volatile memory, each of the tick entries 314 can be appended onto the last location in the non-volatile memory or written to the next adjacent location. In other words, each of the tick entries 314 can be written into a location that is immediately next to the last location of a set of the power-cycle record 402 from the previous power cycle. This method uses fewer blocks of the non-volatile memory instead of writing each of the power-cycle record 402 to a new block location or writing and erasing a designated section of the non-volatile memory multiple times.

The last location that was used to store the tick entries 314 of the previous power cycle can be marked or identified by a unique identifier 404. In this case, the unique identifier 404 should be written before the start of the power-cycle record 402 for another of the power-cycle record 402 is recorded.

After the next power up cycle, the memory controller 104 can perform a search in the memory devices 110 for the unique identifier 404. The unique identifier 404 for the tick entries 314 can be the same for every instance of the tick entries 314 written into the memory devices 110. Read and write addresses of the memory devices 110 can be determined by read and write pointers by the memory controller 104. The read and write pointers can be implemented using modulo counters.

After the next power up cycle, the memory controller 104 can start reading from the end of the highest address in the memory devices 110 and search backwards for the unique identifier 404. The term backward refers to a search direction from the highest address to the lowest address of the non-volatile memory. The power down margin 320 can be approximately calculated as a number of the tick entries 314 before the unique identifier 404 to the work-complete entry 316.

In another example, when the non-volatile memory of the memory devices 110 is not completely cleared after the next power-up cycle and the read and write pointers are implemented using the modulo counters, the next write location can be immediately after the last location previously written before the hold-up power 304 of FIG. 3 was lost. The write pointer can wrap around.

Further for example, the power-cycle record 402 with the unique identifier 404 can be indexed using a measurement array 406, which is a table for tracking each instance of a plurality of the power-cycle record 402. Each entry within the measurement array 406 can be large enough to hold a maximum amount of the tick entries 314 that could possibly occur during power down. The measurement array 406 can index each of the unique identifier 404 of each of the power-cycle record 402. Thus the unique identifier 404 of a specific power cycle can be efficiently accessed using the index information stored in the measurement array 406.

It has been discovered that the unique identifier 404 increases the longevity of the storage control system 100 of FIG. 1 and allows the power-cycle record 402 from various power cycles to be distinguishable. For example, each of the tick entries 314 can be appended to the location of the previous tick entry to conserve blocks and to avoid multiple erasures of the memory. The unique identifier 404 can be used to identify and distinguish one of the power-cycle record 402 to another of the power-cycle record 402 for monitoring changes over time of the power down margin 320 and the work length 322.

Figure 5:
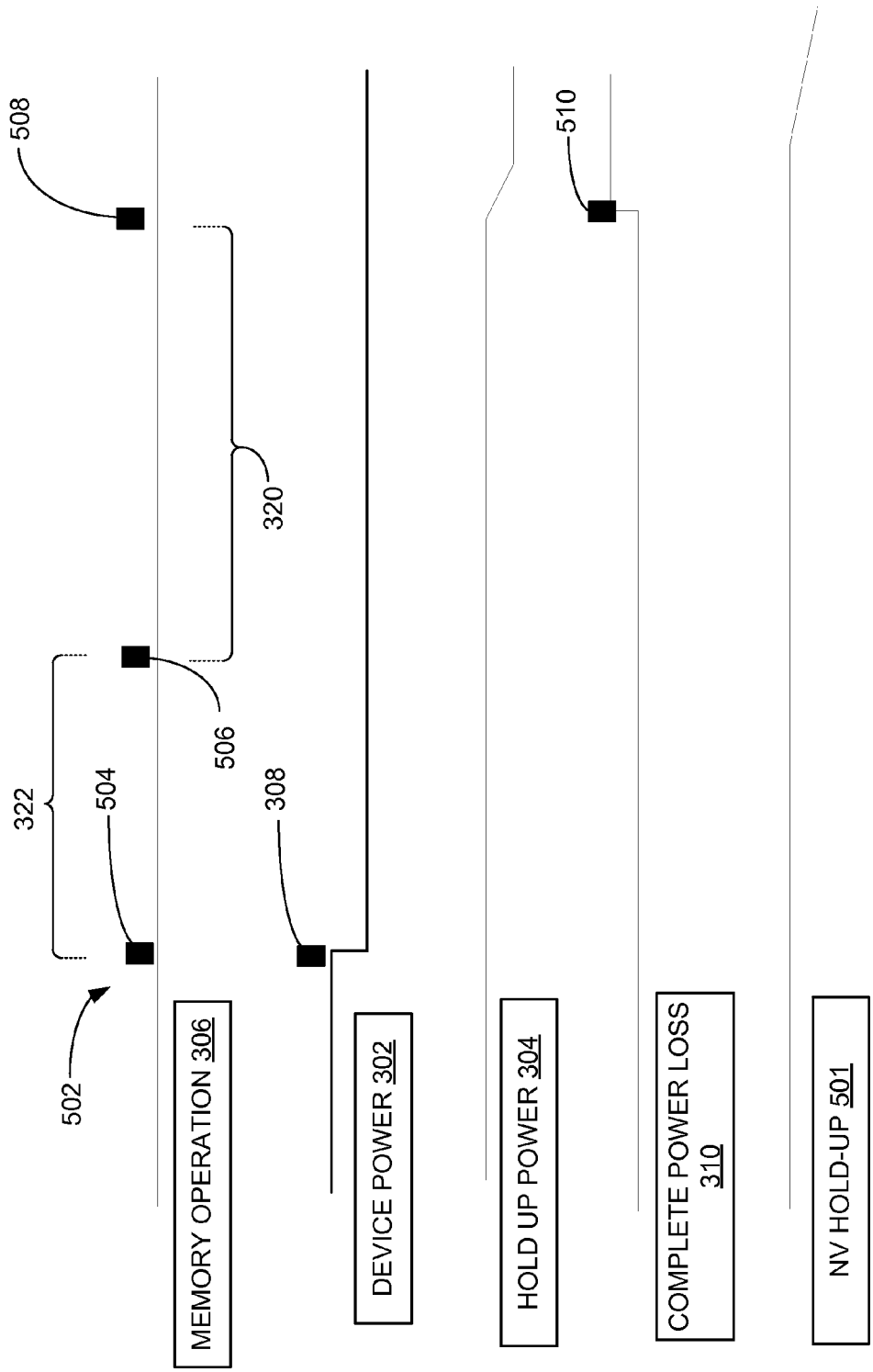
FIG. 5 is a second exemplary timing diagram of the storage control system.

Referring now to FIG. 5, therein is shown a second exemplary timing diagram of the storage control system 100 of FIG. 1. The second exemplary timing diagram depicts a second method of measuring the power down margin 320 and the work length 322 of the present invention.

The second exemplary diagram is similar to the exemplary diagram in FIG. 3 and includes the device power 302, the hold-up power 304, and the memory operation 306. Additionally, the second exemplary diagram includes a non-volatile hold-up power 501.

The non-volatile hold-up power 501 can be similar to the hold-up power 304 of FIG. 3 except the non-volatile hold-up power 501 is an additional power source for the memory devices 110 of FIG. 1. The memory devices 110 can be powered by a separate power hold-up circuit that is different from a circuit that generates the hold-up power 304 for the main device. The memory devices 110 can include a non-volatile storage device that does not consume as much power as other storage devices.

The storage control system 100 can include a method for generating a timestamp information 502, which is defined as information indicating the time and date of the occurrence of an event. For example, the timestamp information 502 can include a time of day, a date, and an event type. The timestamp information 502 can include a power-loss stamp 504, a completion stamp 506, and a depletion stamp 508. The timestamp information 502 can be stored in the NOR device 113 of FIG. 1.

At the detection of the power-down signal 308, the memory controller 104 generates the power-loss stamp 504. The power-loss stamp 504 can include a recording of the current time of the power-down signal 308, which can be read from an available counter.

The storage control system 100 proceeds with the memory operation 306 including the hardening process 312 of FIG. 3. Information from the hardening process 312 can be stored in the NAND device 115 of FIG. 1. When the hardening process 312 is complete, the memory controller 104 can generate the completion stamp 506. The completion stamp 506 can include a recording of current time when the hardening process 312 was concluded.

At the conclusion of the hold-up power 304 and near the complete power loss 310, the memory controller 104 of FIG. 1 can generate a threshold power signal 510. The threshold power signal 510 is defined as a signal that indicates that there is just enough power to write one additional entry into the memory devices 110. The threshold power signal 510 can be generated when the hold-up power 304 reaches a predetermined voltage level.

After detecting the threshold power signal 510, the memory controller 104 can generate the depletion stamp 508. The depletion stamp 508 includes the time of occurrence of the threshold power signal 510. If the memory controller 104 has insufficient power to record the depletion stamp 508 into the memory devices 110, the memory controller 104 can use the non-volatile hold-up power 501 to record the depletion stamp 508.

The timestamp information 502 can be used to calculate the work length 322, the power down margin 320, and the recorded time 318 of FIG. 3 of the hold-up power 304. The memory controller 104 can use the power-loss stamp 504 and the completion stamp 506 to calculate the work length 322 based on the stored times within the stamps. The memory controller 104 can use the completion stamp 506 and the depletion stamp 508 to calculate the power down margin 320 based on the stored times within the stamps. If the work length 322 varies along power cycles, the memory controller 104 can extrapolate a time as in worst-case scenario for comparisons among power cycles.

It has been discovered that the power down margin 320 and the work length 322 of the hardening process 312 provides the amount of time that the storage control system 100 is able to continue operating after the device power 302 has been removed. The power down margin 320 can be used to indicate the spare time available to the storage control system 100 to complete the hardening process 312 and to ensure that the hardening process 312 does not exceed the available time provided by the hold-up power 304.

It has been discovered that determining the power down margin 320 and the work length 322 provides indicators for assessing the system integrity of the storage control system 100. If the duration of the power down margin 320 decreases, the detection of the decrease can provide information that the hold-up power 304 is degrading. The storage control system 100 can replace the non-volatile memory of the memory devices 110 for improving performance and the work length 322 of the hardening process 312 can be decreased to counteract a degradation of the hold-up power 304. The improved reliability is critical to address the concern that over time, the hold-up power 304 will degrade and that the power down margin 320 ensures that the storage control system 100 will continue to operate for time intended by the device's design.

It has been discovered that the duration of the hardening process 312 provides additional indicators for assessing the health and integrity of the memory devices 110 used for the hardening process 312. If the duration of the work length 322 increases, the storage control system 100 can replace the non-volatile memory of the memory devices 110 to increase the speed of the hardening process 312.

It has also been discovered that detection of the power-down signal 308 and measurement of the power down margin 320 for the hold-up power 304 provides improved reliability by providing a sufficient amount of time for the memory controller 104 to completely write the in-flight data 328 of FIG. 3 to the memory devices 110. The sufficient amount of time is critical since capacitors that provide the hold-up power 304 fade as storage drives age.

It has been discovered that writing the timestamp information 502 into the memory devices 110, such as non-volatile memory can provide a low-level and inexpensive method of determining the power down margin 320 and the work length 322 of the hardening process 312 compared to other methods that use messaging mechanisms.

Figure 6:
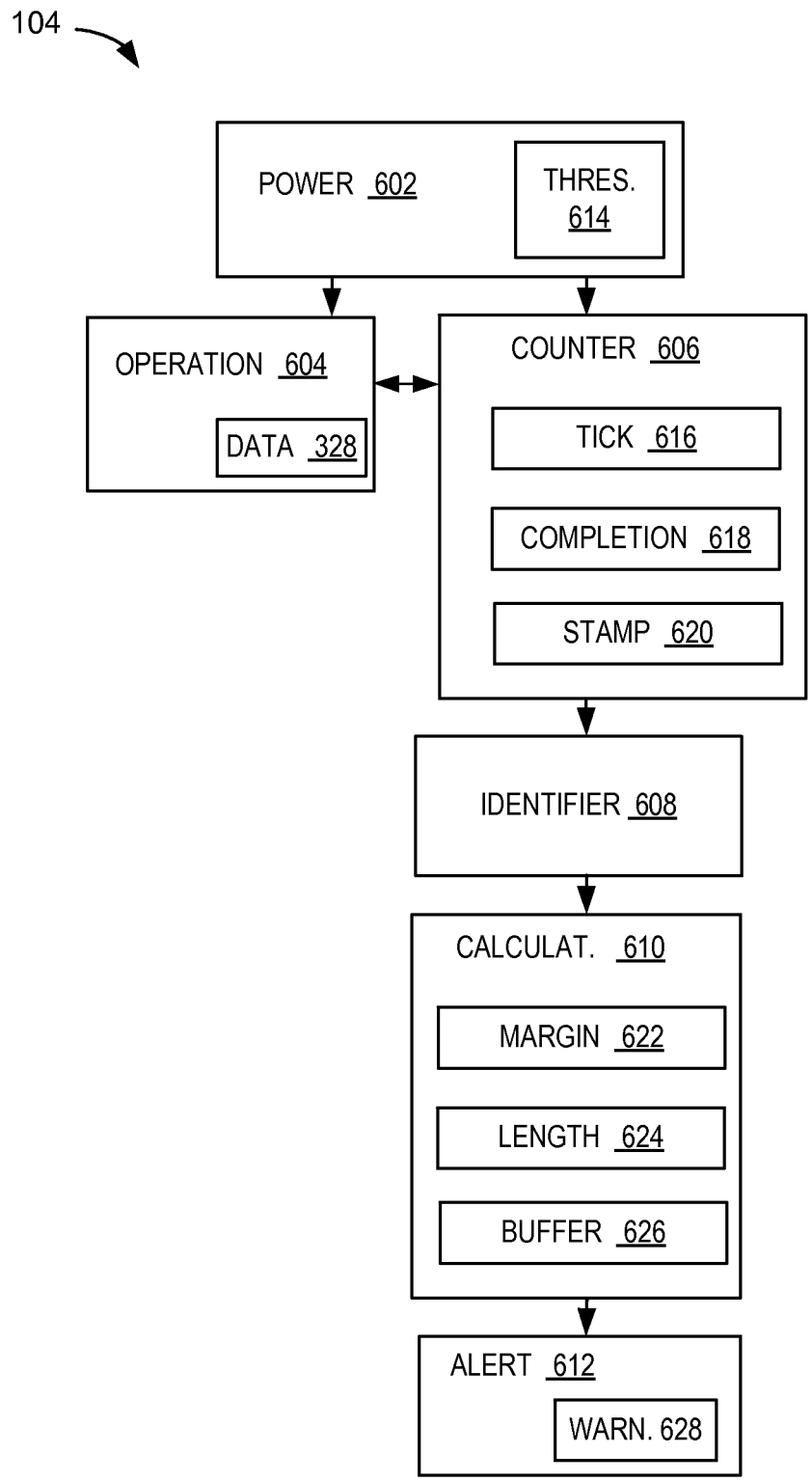
FIG. 6 is a control flow of the memory controller.

Referring now to FIG. 6, therein is shown a control flow of the memory controller 104 of FIG. 2. The memory controller 104 can include a power module 602, an operation module 604, a counter module 606, an identifier module 608, a calculation module 610, and an alert module 612.

In the control flow, as an example, each module is indicated by a number and successively higher module numbers follow one another. Control flow can pass from one module to the next higher numbered module unless explicitly otherwise indicated. The control unit 202 of FIG. 2 can be coupled to the modules of the memory controller 104 for executing the control flow of the modules.

The power module 602 can generate the power-down signal 308. The power module 602 detects if the device power 302 of FIG. 3 is switched off and detects the voltage of the hold-up power 304 of FIG. 3. If the device power 302 is off, the power module 602 can generate the power-down signal 308 of FIG. 3. The power module 602 can include a threshold power module 614.

The threshold power module 614 generates the threshold power signal 510 of FIG. 5. The threshold power signal 510 can be generated when the hold-up power 304 reaches a predetermined voltage level.

The operation module 604 performs the hardening process 312 of FIG. 3. The operation module 604 stores the in-flight data 328 and in-transit data in preparation for the complete power loss 310 of FIG. 3. The information of the hardening process 312 including the in-flight data 328 can be written into the NAND flash memory of the memory devices 110. For example, the NAND device 115 of FIG. 1 can store the in-flight data 328.

The operation module 604 can inform the counter module 606 with information. For example, the operation module 604 can inform the counter module 606 of the completion of the hardening process 312 for generating the work-complete entry 316 of FIG. 3.

The counter module 606 tracks the recorded time 318 of FIG. 3. The counter module 606 is coupled to the operation module 604 for providing markers for each of the events of the memory operation 306 of FIG. 3. The counter module 606 can include a tick module 616, a completion module 618, and a stamp module 620. The counter module 606 can store information of the recorded time 318 into the NOR device 113 of FIG. 1. The counter module 606 can also store information associated with the recorded time 318 into the memory devices 110 of FIG. 1, including the NAND device 115 or into the storage unit 204 of FIG. 2.

The tick module 616 generates the tick entries 314 of FIG. 3. The tick module 616 can begin generating the tick entries 314 after the detection of the power-down signal 308 by the power module 602. The tick module 616 can generate the tick entries 314 until the hold-up power 304 has been depleted.

The tick module 616 can store the tick entries 314 into the NOR device 113. For example, the NOR device 113 can include SPI NOR flash based on the configuration of the storage control system 100. The tick entries 314 can be written a single bit at a time when storing within the NOR device 113. The NOR device 113 conserves overall storage capacity because the tick entries 314 are not written as an eight kilobyte block within NAND flash.

The completion module 618 generates the work-complete entry 316 after the completion of the hardening process 312. After the completion of the hardening process 312 by the operation module 604, the completion module 618 can generate the work-complete entry 316 in line with the tick entries 314. The completion module 618 can store the work-complete entry 316 in the NOR device 113.

The stamp module 620 generates the timestamp information 502 of FIG. 5. The stamp module 620 generates the power-loss stamp 504 of FIG. 5, the completion stamp 506 of FIG. 5, and the depletion stamp 508 of FIG. 5 at the occurrence of when the power-down signal 308, at the conclusion of the hardening process 312, and at the threshold power signal 510, respectively. The stamp module 620 can store the timestamp information 502 in the NOR device 113.

The identifier module 608 can generate the unique identifier 404 of FIG. 4 for each of the power-cycle record 402 of FIG. 4. The unique identifier 404 allows the power-cycle record 402 from one power cycle to be distinguishable from another of the power-cycle record 402. The unique identifier 404 assists the memory controller 104 in determining if there are fluctuations in the power down margin 320 of FIG. 3 and the work length 322 of FIG. 3 for each of the power-cycle record 402.

The calculation module 610 can analyze the recorded time 318 of the power-cycle record 402 for determining the power down margin 320 and the work length 322. The calculation module 610 can include a length module 624, a margin module 622, and a buffer module 626.

The length module 624 calculates the work length 322 of the hardening process 312. The work length 322 can be calculated by determining the number of the tick entries 314 between the power-down signal 308 and the work-complete entry 316. The length module 624 can also determine the work length 322 by measuring the time between the power-loss stamp 504 and the completion stamp 506.

The margin module 622 calculates the power down margin 320. The power down margin 320 can be calculated by determining the number of the tick entries 314 between the work-complete entry 316 and the complete power loss 310. The margin module 622 can also determine the power down margin 320 by measuring the time between the completion stamp 506 and the depletion stamp 508.

The buffer module 626 determines if the power down margin 320 has decreased below the buffer threshold 324 of FIG. 3. If the power down margin 320 falls below the buffer threshold 324, then there may be insufficient time to complete the hardening process 312 after the power-down signal 308.

The alert module 612 can trigger a warning 628. The warning 628 can be triggered when the power down margin 320 reaches or drops below the buffer threshold 324. The warning 628 can alert the memory controller 104 to select another section of the memory devices 110 of FIG. 1 for storing information for the memory operation 306 and the recorded time 318.

The modules of the memory controller 104 can represent dividing the operations of the present invention into subtasks. Each function of the modules can be executed and tracked independently by the memory controller 104.

The storage control system 100 describes the module functions or order as an example. The modules can be partitioned differently. For example, the power module 602, the operation module 604, the counter module 606, and the calculation module 610 can be implemented as one module or with lesser number of modules. Each of the modules can operate individually and independently of the other modules.

Each of the functions or tasks of the present invention can be tailored to hardware and firmware changes as the product matures. Substitutions of capacitor values, manufacture, quantity, and other design changes would be partitioned in such a way as to make to process modular based on the specific build. For example, each module of a firmware can track a specific aspect of the hardware.

The storage control system 100 can include the NOR device 113 and the NAND device 115 for storing information in parallel. The NOR device 113 can include SPI NOR flash, MRAM, PCM, FRAM, or a combination thereof for storing drive firmware and other pieces of ancillary data such as error log files, running statistics, and runtime configuration.

The NAND device 115 can be used to store information from the hardening process 312 including host data and meta data concurrently with information being stored on the NOR device 113. The bus interface used for the NOR device 113 can be different from the bus interface used for the NAND device 115 for allowing storage on both devices to operate in parallel. For example, a three wire bus can be attached to a SPI NOR flash and an eighteen wire bus can be attached to the NAND device 115.

Information stored on the NOR device 113 can be written as a single bit at a time instead of using eight kilobytes of a NAND flash and thus overall storage capacity is preserved. For example, the tick entries 314, the work-complete entry 316, the buffer threshold 324, the unique identifier 404, the timestamp information 502, the power-loss stamp 504, the completion stamp 506, and the depletion stamp 508 can all be written into the NOR device 113 or the storage unit 204 of FIG. 2 as single bit increments.

It has been discovered that the power down margin 320 and the work length 322 of the hardening process 312 provides the amount of time that the storage control system 100 of FIG. 1 is able to continue operating after the device power 302 has been removed. The power down margin 320 can be used to indicate the spare time available to the storage control system 100 to complete the hardening process 312 and to ensure that the hardening process 312 does not exceed the available time provided by the hold-up power 304.

It has been discovered that the storage control system 100 can include the use of multiple memory types, such as the NOR device 113 and the NAND device 115, including SPI NOR flash memory and NAND flash memory, to increase shutdown speed and preserve overall storage space. For example, information stored during the hardening process 312 including host data and meta data can be stored in NAND flash memory, while the information of the power-cycle record 402 can be stored in the NOR device 113, such as SPI NOR flash memory in parallel with the hardening process 312.

It has been discovered that determining the power down margin 320 and the work length 322 provides indicators for assessing the system integrity of the storage control system 100. If the duration of the power down margin 320 decreases, the detection of the decrease can provide information that the hold-up power 304 is degrading. The storage control system 100 can replace the non-volatile memory of the memory devices 110 for improving performance and the work length 322 of the hardening process 312 can be decreased to counteract a degradation of the hold-up power 304. The improved reliability is critical to address the concern that over time, the hold-up power 304 will degrade and that the power down margin 320 ensures that the storage control system 100 will continue to operate for time intended by the device's design.

As NAND flash ages, program and erases cycles will increase, which in turn adds length to the hardening process 312. For example, an erase cycle will typically go from 2 ms to 10 ms at the end of life of the NAND flash, which would also increase the length of the hardening process 312. Longer lengths for the conclusion of the hardening process 312 also provides an indication of the health of the NAND flash in the storage control system 100 in addition to being used as an indicator for the health of the hold-up power 304.

It has been discovered that the duration of the hardening process 312 provides additional indicators for assessing the health and integrity of the memory devices 110 used for the hardening process 312. If the duration of the work length 322 increases, the storage control system 100 can replace the non-volatile memory of the memory devices 110 to increase the speed of the hardening process 312.

It has also been discovered that detection of the power-down signal 308 and measurement of the power down margin 320 for the hold-up power 304 provides improved reliability by providing a sufficient amount of time for the memory controller 104 to completely write the in-flight data 328 to the memory devices 110. The sufficient amount of time is critical since capacitors that provide the hold-up power 304 fade as storage drives age.

It has been discovered that writing the tick entries 314 into the memory devices 110, such as non-volatile memory can provide a low-level and inexpensive method of determining the power down margin 320 and the work length 322 of the hardening process 312 compared to other methods that use messaging mechanisms. The tick entries 314 provide a method of tracking the hold-up power 304 at the complete power loss 310, when no power remains to write to the memory devices 110.

It has been discovered that breaking each operation of the modules of the memory controller 104 into monitored sub-tasks allows each operation can be monitored separately. It has been further discovered that writing the timestamp information 502 into the memory devices 110, such as non-volatile memory can provide a low-level and inexpensive method of determining the power down margin 320 and the work length 322 of the hardening process 312 compared to other methods that use messaging mechanisms.

It has been discovered that the tick entries 314, the work-complete entry 316, the buffer threshold 324, the unique identifier 404, the timestamp information 502, the power-loss stamp 504, the completion stamp 506, and the depletion stamp 508 can be written into the NOR device 113, such as SPI NOR flash to preserve storage space. For example, the tick entries 314 and the timestamp information 502 can be written into SPI NOR flash memory a single bit at a time instead of using eight kilobytes blocks of NAND flash memory.

It has been discovered that the use of the NOR device 113 for storing the recorded time 318, the tick entries 314, the work-complete entry 316, the unique identifier 404, the timestamp information 502, the power-loss stamp 504, the completion stamp 506, and the depletion stamp 508 reduces power consumption of the storage control system 100 over other memory types. For example, the NOR device 113 consumes less power than storing the same information in the NAND device 115. The partitioning of data storage into the NOR device 113 and the NAND device 115 conserves overall power consumption than products that only use NAND flash.

It has also been discovered that the use of both the NOR device 113 and the NAND device 115 for partitioning different types of information conserves circuit board space by replacing NAND flash chips with smaller NOR flash. The NOR device 113 can take the place of some NAND chips on the circuit board allowing for smaller hardware designs and configurations for the storage control system 100.

The physical transformation of process steps including calculating the power down margin 320 results in movement in the physical world, such as the alert module 612 generating the warning 628 to the memory controller 104 that the power down margin 320 is insufficient, based on the operation of the storage control system 100. As the movement in the physical world occurs, the movement itself creates additional information that is converted back for calculating the power down margin 320 for the continued operation of the storage control system 100 and to continue the movement in the physical world.

Figure 7:
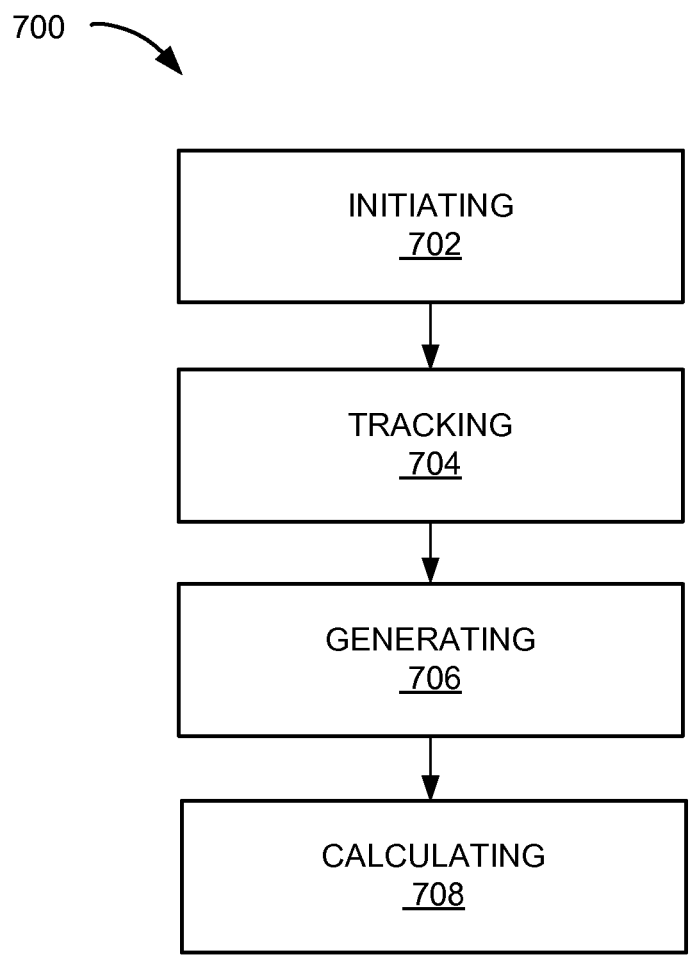
FIG. 7 is a flow chart of a method of operation of the storage control system of FIG. 1 in a further embodiment of the present invention.

Referring now to FIG. 7, therein is shown a flow chart of a method 700 of operation of the storage control system 100 of FIG. 1 in a further embodiment of the present invention. The method 700 includes: initiating a hardening process beginning at a power-down signal in a block 702; tracking a recorded time beginning at the power-down signal in a block 704; generating a work-complete entry in memory devices at a conclusion of the hardening process in a block 706; and calculating a power down margin by determining the recorded time between the work-complete entry and a complete power loss of a hold-up power in a block 708.

Thus, it has been discovered that the storage control system of the present invention furnishes important and heretofore unknown and unavailable solutions, capabilities, and functional aspects for a storage control system with power down mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a storage control system comprising:
    initiating a hardening process beginning at a power-down signal, wherein host data and meta data are stored in a first portion of non-volatile memory of the storage control system during the hardening process;
    tracking time information beginning at the power-down signal;
    generating a work-complete entry in the non-volatile flash memory at a conclusion of the hardening process;
    calculating a power down margin corresponding to elapsed time between the conclusion of the hardening process and a complete power loss of a hold-up power; and
    in accordance with a determination that the power down margin is less than a buffer threshold, designating a second portion of the non-volatile memory of the storage control system, different from the first portion, to be used during a next hardening process.

2. The method as claimed in claim 1, wherein tracking the time information includes generating tick entries between the power-down signal and the complete power loss.

3. The method as claimed in claim, wherein tracking the time information includes generating timestamp information between the power-down signal and the complete power loss.

4. The method as claimed in claim 1, further comprising generating a unique identifier for distinguishing the time information of the hardening process from the time information of a different hardening process.

5. The method of claim 1, further comprising:
storing the time information, corresponding to the power-down signal, in the non-volatile memory of the storage control system in parallel with the hardening process; and
calculating a work length of the hardening process corresponding to elapsed time between the power-down signal and the conclusion of the hardening process.

6. The method as claimed in claim 1, wherein:
tracking the time information includes generating a power-cycle record; and
further comprising:
generating a unique identifier for indexing the power-cycle record.

7. The method as claimed in claim 1, wherein tracking the time information includes generating timestamp information after the power-down signal, the timestamp information includes a power-loss stamp, a completion stamp, and a depletion stamp.

8. The method as claimed in claim 1, further comprising generating a warning when the power down margin is below the buffer threshold.

9. A storage control system comprising:
a control unit for initiating a hardening process beginning at a power-down signal, wherein host data and meta data are stored in a first portion of non-volatile memory of the storage control system during the hardening process;
a counter module, coupled to the control unit, for tracking time information beginning at the power-down signal;
a completion module, coupled to the counter module, for generating a work-complete entry in the non-volatile flash memory at a conclusion of the hardening process; and
a calculation module, coupled to the completion module, for calculating a power down margin corresponding to elapsed time between the conclusion of the hardening process and a complete power loss of a hold-up power;
the control unit is further for designating a second portion of the non-volatile memory of the storage control system, different from the first portion, to be used during a next hardening process in accordance with a determination that the power down margin is less than a buffer threshold.

10. The system as claimed in claim 9, wherein the counter module is for generating tick entries between the power-down signal and the complete power loss.

11. The system as claimed in claim 9, wherein the counter module is for generating timestamp information between the power-down signal and the complete power loss.

12. The system as claimed in claim 9, further comprising an identifier module, coupled to the control unit, for generating a unique identifier for distinguishing the time information of the hardening process from the time information of a different hardening process.

13. The system as claimed in claim 9, further comprising a length module, coupled to the control unit, for calculating a work length of the hardening process corresponding to elapsed time between the power-down signal and the conclusion of the hardening process.

14. The system as claimed in claim 9, wherein:
the counter module is for generating a power-cycle record; and
further comprising:
an identifier module, coupled to the control unit, for generating a unique identifier for indexing the power-cycle record.

15. The system as claimed in claim 9, wherein the counter module is for generating timestamp information after the power-down signal, the timestamp information includes a power-loss stamp, a completion stamp, and a depletion stamp.

16. The system as claimed in claim 9, wherein:
the counter module is for tracking the time information in the non-volatile memory in parallel with the hardening process.

17. The system as claimed in claim 9, further comprising an alert module, coupled to the control unit, for generating a warning when the power down margin is below the buffer threshold.

* * * * *

UNITED STATES PATENT AND TRADEMARK OFFICE
CERTIFICATE OF CORRECTION

PATENT NO. : 9,298,252 B2
APPLICATION NO. : 13/855567
DATED : March 29, 2016
INVENTOR(S) : Ellis et al.

Page 1 of 1

It is certified that error appears in the above-identified patent and that said Letters Patent is hereby corrected as shown below:

In the claims, claim 3, column 16, line 60, please delete "claim, wherein" and insert --claim 1, wherein--.

Signed and Sealed this
Fourteenth Day of June, 2016

Michelle K. Lee
*Director of the United States Patent and Trademark Office*